United States Patent
Seiler et al.

(10) Patent No.: US 7,875,203 B2
(45) Date of Patent: Jan. 25, 2011

(54) DEICING AGENT AND/OR ANTI-ICING AGENT

(75) Inventors: Matthias Seiler, Griesheim (DE); Stefan Bernhardt, Offenbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/310,318

(22) PCT Filed: Jul. 6, 2007

(86) PCT No.: PCT/EP2007/056895
§ 371 (c)(1),
(2), (4) Date: May 12, 2009

(87) PCT Pub. No.: WO2008/025589
PCT Pub. Date: Mar. 6, 2008

(65) Prior Publication Data
US 2009/0309061 A1    Dec. 17, 2009

(30) Foreign Application Priority Data
Aug. 26, 2006   (DE) ........................ 10 2006 040 122

(51) Int. Cl.
C09K 3/18   (2006.01)
(52) U.S. Cl. ........................ 252/70; 106/13
(58) Field of Classification Search ............ 106/13; 252/70
See application file for complete search history.

(56) References Cited

U.S. PATENT DOCUMENTS

| | | | |
|---|---|---|---|
| 5,750,047 A | 5/1998 | Lemma | |
| 6,284,233 B1 * | 9/2001 | Simon et al. | 424/78.03 |
| 6,287,552 B1 * | 9/2001 | Tournilhac et al. | 424/78.03 |
| 6,475,495 B1 * | 11/2002 | Maignan et al. | 424/401 |
| 6,544,939 B1 * | 4/2003 | Haas et al. | 510/202 |
| 6,617,418 B1 * | 9/2003 | Magnusson et al. | 528/417 |
| 7,094,826 B2 * | 8/2006 | Martin et al. | 524/502 |
| 7,235,600 B2 * | 6/2007 | Jonsson et al. | 524/562 |
| 7,268,203 B2 * | 9/2007 | Bruchmann et al. | 528/60 |
| 2004/0086479 A1 * | 5/2004 | Grinstaff et al. | 424/78.17 |
| 2006/0107466 A1 * | 5/2006 | Sassi et al. | 8/115.51 |
| 2007/0298006 A1 * | 12/2007 | Tomalia et al. | 424/78.03 |
| 2008/0112891 A1 * | 5/2008 | Tomalia et al. | 424/9.322 |
| 2009/0041813 A1 * | 2/2009 | Bouillo et al. | 424/401 |

FOREIGN PATENT DOCUMENTS

| | | |
|---|---|---|
| CA | 2 147 046 | 12/2003 |
| DE | 44 12 790 A 1 | 10/1995 |
| JP | 10 237428 A | 9/1998 |
| JP | 200656861 A * | 3/2006 |
| WO | WO03/087222 A1 * | 10/2003 |

OTHER PUBLICATIONS

International Search Report for PCT/EP2007/056895 filed Jul. 6, 2007.
Written Opinion of the International Searching Authority for PCT/EP2007/056895 filed Jul. 6, 2007.
English language abstract for DE 44 12 790, listed as document B2 above. [Oct. 1995].
English language abstract for JP 10 237428 listed as document B3 above. [Sep. 1998].
English Translation of International Preliminary Report on Patentability for PCT/EP2007/056895 filed Jul. 6, 2007.
English Translation of Written Opinion of the International Searching Authority for PCT/EP2007/056895 filed Jul. 6, 2007.

* cited by examiner

*Primary Examiner*—Anthony J Green
(74) *Attorney, Agent, or Firm*—Law Office of: Michael A. Sanzo, LLC

(57) ABSTRACT

The invention relates to a deicing or anti-icing agent containing, based in each case on its total weight, from 35.0% by weight to 95.0% by weight of at least one glycol, from 0.001% by weight to 5.0% by weight of at least one dendritic polymer and from 0.01% by weight to 5.0% by weight of at least one further thickener and optionally water.

It furthermore relates to the use of from 0.001 to 5.0% by weight of at least one dendritic polymer and from 0.01% by weight to 5.0% by weight of at least one further thickener for thickening a composition which contains from 35.0% by weight to 95.0% by weight of at least one glycol and optionally water.

17 Claims, No Drawings

DEICING AGENT AND/OR ANTI-ICING AGENT

CROSS REFERENCE TO RELATED APPLICATIONS

The present application is US national stage of international application PCT/EP2007/056895, which had an international filing date of Jul. 6, 2007, and which was published in German under PCT Article 21(2) on Mar. 6, 2008. The international application claims priority to German application DE 10 2006 040 122.0, filed on August 26, 2006. These prior applications are hereby incorporated by reference in their entirety.

The present invention relates to water/glycol mixtures which have been thickened with dendritic polymers and can be used as deicing agents and/or anti-icing agents, in particular as anti-icing agents. These mixtures serve for removing frozen precipitation, such as ice and snow, from surfaces and for avoiding reicing of these surfaces.

Deicing agents and anti-icing agents are particularly important for the treatment of aircraft surfaces. During take-off, these fluids should flow off the aircraft surfaces owing to the resultant shear forces. For the sake of simplicity, the totality of these fluids will be referred to below as aircraft deicing agents or deicing agents.

During the winter months, aircraft surfaces may become coated by frozen precipitation. This frozen precipitation must be removed before the aircraft takes off, since it leads to considerable impairment of the lift required for takeoff.

A distinction is made between deicing agents, which are predominantly used for removing frozen precipitation, and anti-icing agents, which are intended to counteract reicing on already de-iced and hence cleaned aircraft surfaces.

Aircraft deicing agents must meet a large number of requirements. According to the SAE specifications AMS (Aerospace Material Standards) 1424 and AMS 1428, not only are the flow-off behavior and the anti-icing time investigated but also many further physical properties.

These include, for example, the shelf-life of the aircraft deicing agent. Viscosity of the aircraft deicing agent should as far as possible not change over a relatively long period during storage. A good aircraft deicing agent should as far as possible not be corrosive, especially not to aluminum, magnesium, steel and acrylic glass. It should as far as possible be environmentally compatible and as far as possible should not support fires.

In addition, thickened aircraft deicing agents should as far as possible be stable to shearing. The fluids are applied by spray vehicles which cause high mechanical loading of the fluid. The deicing agents should lose as little as possible of their original viscosity.

Furthermore, residues of aircraft deicing agents which have collected in aerodynamically calm zones of the wings after the aircraft has taken off and hence could not flow off should as far as possible form no gel deposits.

In general, water/glycol-based deicing agents are used for removing frozen precipitation. The glycol serves as a freezing point-depressing medium. In addition, surfactants which reduce the surface tension of the deicing agent and thus improve the wetting of the aircraft surfaces are present. Moreover, deicing agents may contain corrosion inhibitors, antifoams, dyes and flame-retardant substances. Such non-thickened deicing agents are distinguished by Newtonian flow behavior. This means that their viscosity is independent of shearing. According to the SAE (Society of Automotive Engineering) convention, non-thickened deicing agents having Newtonian flow behavior are designated as type I fluids. Type I fluids are diluted with a different amount of water, depending on the outdoor temperature, and are applied in the hot state to the aircraft surfaces by means of spray vehicles. With their aid, frozen deposits can be effectively removed. However, type I fluids provide only very limited protection from reicing.

Such a deicing agent is described, for example, in WO 94/05741. It relates to a deicing agent which contains from 25% to 95% of glycol, a pH regulator which adjusts the pH of the agent to 7 to 10, and at least one nonionic or anionic surfactant.

In contrast to pure deicing agents, anti-icing agents additionally contain thickener substances. The resulting viscosity of these fluids improves the protection from reicing because the fluid flows off the aircraft surfaces only very slowly in the quiescent state and can therefore absorb freezing precipitation over a longer period. Anti-icing agents acquire non-Newtonian, pseudoplastic flow behavior through the thickeners used thereby. The viscosity of these fluids is dependent on shearing. At the time when the aircraft takes off, the viscosity of the fluid decreases very greatly as a result of the increasing drag and it can therefore flow rapidly off the aircraft surfaces. Depending on the anti-icing time, a distinction is made between type II and type IV fluids. Type III fluids are distinguished by particularly pseudoplastic flow behavior, so that they serve for de-icing aircraft with a low takeoff speed.

Generally used thickeners are organic polymers, such as, for example, crosslinked homo- or copolymers of unsaturated carboxylic acids, such as acrylic acid, methacrylic acid and derivatives thereof, such as esters and amides, and furthermore cellulose ethers (alkyl-, hydroxyalkyl- and carboxyalkylcellulose ethers), polyethyleneglycols, polyvinylpyrrolidones, polyvinyl alcohols, polyethylene oxides, xanthan gum and the like, or mixtures of such water-soluble polymers. The thickening mechanism of all these organic polymers is based on the formation of a polymer network in the glycol solution.

The following publications we mention as examples:

U.S. Pat. No. 5,118,434 teaches the use of acrylic acid copolymers to avoid the precipitation of salts from glycol-water mixtures. The copolymers are furthermore said to contain 2-acrylamido-2-methyl-propylsulfonic acid units, 4-styrene sulfonic acid units and/or lower alkyl hydroxyacrylate units and/or salts of these units.

WO 93/24543 describes an anti-icing agent which is based on an aqueous glycol solution and comprises a comb polymer having a hydrophilic polymer backbone and hydrophobic side chains as a thickener.

EP 0 769 541 A1 discloses a deicing agent and anti-icing agent for aircraft which contains, as a thickener, water-soluble crosslinked acrylate homopolymers, from 0.02% by weight to 1.5% by weight of at least one nonionic surfactant and from 0.03% by weight to 1% by weight of at least one water-soluble salt compound. The acrylate polymer has an average molecular weight of from 750 000 g/mol to 1 250 000 g/mol and, in the form of a 0.5% strength by weight aqueous solution with a pH of 7.0 and a temperature of 20° C., has a viscosity of from 1000 mPa·s to 13 000 mPa·s, measured as the Brookfield viscosity at 20 rpm.

U.S. Pat. No. 5,708,068 teaches a deicing or anti-icing agent which contains a thickened aqueous glycol and/or glycerol solution, the thickening being achieved by virtue of the fact that a latex thickener is neutralized with a base in the presence of a complex-forming surfactant.

WO 98/46695 relates to a deicing or anti-icing agent which contains from 35.0% by weight to 80.0% by weight of glycol, water, a first nonionic surfactant having an HLB in the range from 4 to 17, a second nonionic surfactant having an HLB in the range from 5 to 18, a polycarboxylate as an emulsifier and a pH regulator.

However, said thickeners are irreversibly damaged to a greater or lesser extent under mechanical load. This is evident from an irreversible viscosity loss under strong shear stress due to high-speed stirrers, pumps or when flowing through small pipe cross sections. The mechanical load causes a break in the polymer chains and, associated therewith, irreversible damage to the polymer network.

There is therefore the desire for aircraft anti-icing agents which lose as little viscosity as possible on mechanical loading, such as pumping or spraying with spray apparatuses.

In addition, said thickeners tend to form a gel under certain external conditions. If aircraft anti-icing agents collect in aerodynamically calm regions of the aircraft after takeoff, these residues dry completely as a result of the low air pressure at altitudes above 5000 m. These residues can swell to a considerable extent if they come into contact with moisture, such as rain water. The gels resulting therefrom can freeze at low temperatures as occur at great altitudes and can thus block the elevators, with the result that the aircraft is no longer completely maneuverable.

The aircraft anti-icing agents based on conventional thickeners form clearly visible amounts of gel residues. Depending on the thickener type, these gels can be more or less readily detached in the course of rehydration with water. However, a fluid residue which could be completely washed off by the water in the course of the initial immersion processes would be desirable.

There is therefore also the desire for formulating aircraft anti-icing agents in such a way that dried up fluid residues cannot form gel residues with rain water.

For solving these problems, European patent application EP 1 553 152 A2 proposes a deicing or anti-icing agent which contains from 35% by weight to 93% by weight of at least one glycol and from 0.01% by weight to 15% by weight of at least one water-soluble phyllosilicate and water.

A disadvantage is that occasionally high concentrations of the water-soluble phyllosilicates are required in order to achieve a thickening effect. In addition, particularly after prolonged storage of the anti-icing agent, agglomeration of the phyllosilicates may occur, necessitating redispersing or the use of dispersing additives.

An object of the present invention was to provide deicing agents and anti-icing agents having an even better property profile. In particular, the property profile of the deicing agents and anti-icing agents should be improved in at least one, preferably as many as possible, of the following aspects:
  as long a shelf-life as possible,
  as far as possible noncorrosive,
  as low a toxicity as possible,
  as far as possible not fire-promoting,
  as high a stability to shearing as possible,
  after complete drying, as far as possible no formation of residues which can lead to the formation of sparingly soluble gels on rehydration,
  a film which is as clear as possible on the surfaces to be treated and
  as strong a shear dilution as possible, i.e. as high a viscosity as possible at low shear forces and as low a viscosity as possible at high shear forces.

Furthermore, the deicing agents and anti-icing agents should be obtainable in as simple a manner as possible, on an industrial scale and economically.

Moreover, particularly expedient fields of use of the deicing agents and anti-icing agents are to be presented.

By providing a deicing or anti-icing agent which, based in each case on its weight, contains from 35.0% by weight to 95.0% by weight of at least one glycol, from 0.001% by weight to 5.0% by weight of at least one dendritic polymer and from 0.01% by weight to 5.0% by weight of at least one further thickener and optionally water, it is possible in a manner not directly foreseeable to make available a deicing agent or anti-icing agent which has a substantially improved property profile and in particular is distinguished by the following features:
  the agent has a comparatively long shelf-life,
  the agent is noncorrosive, especially not corrosive to aluminum, magnesium, steel and acrylic glass,
  the agent has a comparatively low toxicity,
  the agent does not promote fire,
  the agent has a comparatively high stability to shearing and usually loses no more than 30%, preferably no more than 25% and very particularly preferably no more than 20%, of its original viscosity,
  after complete drying, the formation of residues which could lead to the formation of sparingly soluble gels on rehydration is avoided in the best possible manner:
  the dendritic polymers used generally do not tend to form gels with water and are furthermore distinguished by a generally outstanding solubility in aqueous (polar) systems; small proportions of gel which have nevertheless formed can therefore be easily washed off by water,
  the agent forms a comparatively clear film on the surfaces to be treated:
  the dendritic polymers used are adsorbed onto any crystal growth surfaces forming and thus slow down or prevent the crystallization of constituents of the agent, such as, for example, corrosion inhibitors, flame retardants,
  the agent shows a comparatively strong shear dilution, i.e. it has a comparatively high viscosity at low shear forces and a comparatively low viscosity at high shear forces,
  the effectiveness of conventional thickeners is increased:
  owing to the multiplicity of functional groups, the dendritic polymers used can form a physical network with the thickener, for example via hydrogen bridges or other polar interactions, which network breaks up under shear stress (for example when an aircraft takes off) and permits the agent to flow off.

The present invention therefore relates to a deicing or anti-icing agent which, based in each case on its total weight, contains from 35.0% by weight to 95.0% by weight of at least one glycol, from 0.001% by weight to 5.0% by weight of at least one dendritic polymer and from 0.01% by weight to 5.0% by weight of at least one further thickener and preferably water.

The invention furthermore relates to the use of from 0.001% by weight to 5.0% by weight of at least one dendritic polymer and from 0.01% by weight to 5.0% by weight of at least one further thickener for thickening a composition which contains from 35.0% by weight to 95.0% by weight of at least one glycol and preferably water.

In a preferred embodiment, a deicing agent and/or anti-icing agent according to the invention may comprise the following constituents:

a) from 35.0% by weight to 95.0% by weight, preferably from 45.0% by weight to 94.0% by weight and very particularly preferably from 55.0% by weight to 93.0% by weight of at least one alkylene glycol having 2 or 3 C atoms or at least one oxalkylene glycol having 4 to 6 C atoms, b) from 0 to 10.0% by weight, preferably from 0.02% by weight to 2.0% by weight, of at least one nonionic or anionic surfactant, c) from 0.01% by weight to 5.0% by weight, preferably from 0.05% by weight to 2.0% by weight, of at least one corrosion inhibitor, d) from 0.001% by weight to 5.0% by weight, preferably from 0.005% by weight to 2.0% by weight and very particularly preferably from 0.01% by weight to 0.75% by weight of at least one dendritic polymer, e) from 0.01% by weight to 5.0% by weight, preferably from 0.05% by weight to 2.0% by weight, very particularly preferably from 0.1% by weight to 1.0% by weight, of at least one further thickener, advantageously from the group consisting of the homo- or copolymers of unsaturated carboxylic acids, such as acrylic acid, methacrylic acid and derivatives thereof, such as esters and amides, and furthermore cellulose ethers (alkyl-, hydroxyalkyl- and carboxyalkylcellulose ethers), polyethylene glycols, polyvinylpyrrolidones, polyvinyl alcohols, polyethylene oxides, xanthan gum, f) optionally at least one basic compound from the group consisting of the alkali metal carbonates, alkali metal hydroxides or amines for adjusting the pH value between 6 and 11, g) optionally at least one acidic compound from the group consisting of the inorganic or organic acids for adjusting the pH value between 6 and 11 and h) optionally water.

The percentages by weight always relate to the weight of the deicing agent or of the anti-icing agent.

The constituents b, c, f, g and h are not necessarily present in the deicing agent or anti-icing agent according to the invention. However, preferred deicing agents or anti-icing agents contain one or more further constituents b, c, f, g and h in addition to the constituents a, d and e.

The component a) of the deicing agent according to the invention or of the anti-icing agent is preferably ethylene glycol, propylene glycol (1,2-propylene glycol or 1,3-propylene glycol), diethylene glycol, dipropylene glycol or a mixture of two or more of these glycols, propylene glycols being particularly preferred. The glycols serve in particular for depressing the freezing point and, in addition to water, constitute the main component of the deicing agent.

The component b) can preferably be a fatty alcohol having 6 to 24 C atoms, preferably 8 to 18 C atoms in the alkyl radical or an alkoxylate thereof having 1 to 10, preferably 1 to 8, alkoxy groups, in particular of ethylene oxide, propylene oxide or a mixture thereof, ethylene oxide being preferred. Said alkyl radical in the fatty alcohol may be straight or branched, aliphatic or aromatic, saturated or unsaturated with preferably 1 to 3 double bonds. The following may be mentioned as examples: octyl, decyl, dodecyl, isotridecyl, para-isononylphenyl, para-isooctylphenyl and stearyl alcohol, and furthermore oleyl, cocosalkyl and tallowalkyl alcohol. The component b) may also be a mixture of said fatty alcohols and/or fatty alcohol ethoxylates, for example a fatty alcohol mixture having a $C_{12}$-alkyl radical and $C_{14}$-alkyl radical ($C_{12}$/$C_{14}$-fatty alcohol).

The component b) may furthermore preferably be a potassium and/or sodium alkylarylsulfonate having one or more, preferably one or two, sulfonate groups, one or more, preferably one or two, alkyl groups having 5 to 18 C atoms, preferably 12 to 18 C atoms, and one or more, preferably one or two, benzene rings.

The component c) comprises corrosion inhibitors, as are customary for deicing agents and/or anti-icing agents based on glycols and water. Suitable corrosion inhibitors are alkali metal phosphates, lower alkyl phosphates, such as ethyl phosphate, dimethyl phosphate, isopropyl phosphate and the like, imidazoles, such as 1H-imidazole, methylimidazole, benzimidazole and the like, and triazoles, such as benzotriazole and tolyltriazole. It is also possible to use thiourea, sodium nitrate or butyne-1,4-diol.

Dendritic polymers serve as component d). Among those skilled in the art, "dendritic polymers" designate highly branched, globular polymers. These polymers synthesized from polyfunctional monomers can be divided into two different categories, the "dendrimers" and the "hyperbranched polymers". Dendrimers have a very regular, radially symmetrical structure. In contrast to the dendrimers, hyperbranched polymers are polydisperse and irregular with regard to their branching and structure. In addition to the dendritic and terminal units, linear units also occur in hyperbranched polymers—in contrast to dendrimers.

Regarding the different possibilities for synthesizing dendrimers and hyperbranched polymers, reference may be made in particular to a) Fréchet J. M. J., Tomalia D. A. "Dendrimers And Other Dendritic Polymers" John Wiley &Sons, Ltd., West Sussex, UK 2001, and b) Jikei M., Kakimoto M. "Hyperbranched Polymers: A Promising New Class Of Materials" *Prog. Polym. Sci.*, 26 (2001) 1233-1285, and/or c) Gao C., Yan D. "Hyperbranched Polymers: From Synthesis To Applications" *Prog. Polym. Sci.*, 29 (2004) 183-275, which are hereby incorporated as references and are considered to be part of the disclosure of the present invention.

The dendritic polymers described in these publications are also preferred in the context of the present invention. Furthermore, it is preferable if the dendritic polymers belong to the class consisting of the hyperbranched polymers and preferably have at least 3 repeating units per molecule, more preferably at least 10 repeating units per molecule, even more preferably at least 100 repeating units per molecule, even more preferably at least 200 repeating units and even more preferably at least 400 repeating units, which in each case have at least three, preferably at least four, possibilities for bonding, at least 3 of these repeating units, particularly preferably at least 10 and even more preferably at least 20 being linked in each case via at least three, preferably via at least four, possibilities for bonding to at least three, preferably at least four, further repeating units. The dendritic polymers variously have not more than 10 000, preferably not more than 5000 and particularly preferably not more than 2500 repeating units.

In a preferred embodiment, the dendritic polymer has at least three repeating units which in each case have at least three possible possibilities for bonding, at least three of these repeating units having at least two possible possibilities for bonding.

The term "repeating unit" is preferably understood as meaning a continuously repeating structure within the dendritic molecule. The term "possibility for bonding" is preferably understood as meaning that functional structure within a repeating unit by means of which a link to another repeating unit is possible. The repeating unit is a structure having in each case at least three possibilities for bonding (X, Y, Z):

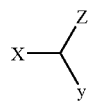

The linking of the monomer building blocks to one another can be effected by polycondensation, by polyaddition, by free radical polymerization, by anionic polymerization, by cationic polymerization, by group-transfer polymerization, by coordination polymerization or by ring-opening polymerization.

According to the invention, the dendritic polymer has a solubility in a glycol-water mixture (particularly preferably 50 parts by weight of glycol/50 parts by weight of water) of at least 0.1 g, preferably at least 1.0 g and particularly preferably at least 2.0 g, based in each case on 100.0 g of glycol-water mixture. The solubility is preferably determined at 25° C.

The measurement of this solubility can be effected by the so-called flask method, the solubility of the pure substance in the solvent being measured.

In this method, the substance (solids must be pulverized) is dissolved in the solvent at a temperature which is slightly above the test temperature. When saturation is reached, the solution is cooled and is kept at the test temperature. The solution is stirred until equilibrium is reached. Alternatively, the measurement can be carried out directly at the test temperature if it is ensured by appropriate sampling that the saturation equilibrium has been reached. The concentration of the test substance in the solution, which must not contain any undissolved substance particles, is then determined by a suitable method of analysis.

In a very particularly preferred variant of the present invention, the dendritic polymer contains polyether, polyetheramide, polyetherimide, polyethersulfone, polyester, polyesteramide, polyesterimide, polyamide, polyamidoamine, polyimidoamine, polyurethane, polyurea, polyureaurethane, polyglycerol, polyvinylidene fluoride, polysulfonamine, polyethyleneimine, polyacrylic acid, polyacrylate, polysiloxane, polyethersiloxane, polyimide and/or polymethacrylate units, polyester, polyesteramide and/or polyether units having proven very particularly useful for the purposes of the present invention.

The proportion of these units is expediently from 2 to 10 000, preferably from 2 to 5000 and particularly preferably from 2 to 3000.

In a first particularly preferred embodiment, the dendritic polymer has terminal $NH_2$ groups.

In a second particularly preferred embodiment, the dendritic polymer has terminal COOH groups.

In a third particularly preferred embodiment, the dendritic polymer has terminal OH groups.

The dendritic polymer preferably has a weight average molecular weight Mw in the range from 300 g/mol to 100 000 g/mol, advantageously in the range from 300 g/mol to 50 000 g/mol, particularly preferably in the range from 300 g/mol to 40 000 g/mol, in particular in the range from 300 g/mol to 20 000 g/mol.

The determination of the molecular weight, in particular the determination of the weight average molecular weight Mw and of the number average molecular weight Mn, can be effected in a manner known per se, for example by means of gel permeation chromatography (GPC), the measurement preferably taking place in DMF and polyethylene glycols preferably being used as a reference (cf. inter alia Burgath et al. in Macromol. Chem. Phys., 201 (2000) 782-791). Here, a calibration curve which was advantageously obtained with the aid of polystyrene standards was expediently used. These variables are therefore apparent measured values.

Alternatively, the number average molecular weight can also be determined by vapor or membrane osmosis, which are described in more detail, for example, in K. F. Arndt; G. Müller; Polymercharakterisierung; Hanser Verlag 1996 (vapor pressure osmosis) and H.-G. Elias, Makromoleküle Struktur Synthese Eigenschaften, Hütig & Wepf Verlag 1990 (membrane osmosis). According to the invention, however, GPC has proven very particularly useful.

The polydispersity Mw/Mn of preferred dendritic polymers is in the range of 1-50, advantageously in the range of 1-40, particularly preferably in the range of 1-20, in particular in the range of 1-10.

The degree of branching of the dendritic polymer is expediently in the range from >0.0% to 85.0%, preferably in the range from >0.0% to 75.0%, in particular in the range from >0.0% to 65.0%. According to a particularly preferred embodiment, the degree of branching of the dendritic polymer is greater than 10.0%, preferably greater than 20.0%, in particular greater than 25.0%.

The degree of branching can be determined according to Frey and Fréchet. An exact description of these methods is to be found in D. Hölter, A. Burgath, H. Frey, Acta Polymer, 1997, 48, 30, and H. Magnusson, E. Malmström, A. Hult, M. Joansson, Polymer 2002, 43, 301.

Among the dendritic polymers which can be used according to the invention, the hyperbranched polyesters, polyethers or polyester/ethers which are already commercially available under the brand Boltorn® from Perstorp AB, the hyperbranched polyethyleneimines available as Polymin®, Lupasol® and/or PEI® from BASF AG and the hyperbranched polyesteramides available under the brand Hybrane® from DSM BV, The Netherlands, are particularly advantageous. Hyperbranched polyglycerols from Hyperpolymers, with 800 g/mol<Mw<40 000 g/mol, e.g. having the type designation PG-2, PG-5 and PG-6, and polyethyleneimines having the type designation PEI-5 and PEI-25 from Hyperpolymers GmbH are another example of a particularly suitable dendritic polymer.

Polyimines of the Epomin® brand from Nippon Shokubai Co., Ltd. are a further example of a particularly suitable hyperbranched polymer.

The component e) is a further preferably water-soluble thickener. Crosslinked homo- or copolymers of unsaturated carboxylic acids, such as acrylic acid, methacrylic acid and derivatives thereof, such as esters and amides, and furthermore cellulose ethers (alkyl-, hydroxyalkyl- and carboxyalkylcellulose ethers), polyethylene glycols, polyvinylpyrrolidones, polyvinyl alcohols, polyethylene oxides, xanthan gum and the like or mixtures of such water-soluble polymers are preferably used. The best results are obtained with homo- and copolymers of acrylic acid and/or of methacrylic acid.

The component f) is preferably a basic pH regulator from the group of the alkali metal hydroxides, such as NaOH and KOH, the alkylamines, such as butylamine, hexylamine, octylamine and isononylamine, and the alkanolamines, such as mono-, di- and triethanolamine. The alkali metal hydroxides are particularly preferred. If the deicing agent and/or anti-icing agent according to the invention contains such a basic compound, the content thereof is preferably from 0.1% by weight to 5.0% by weight, based on the weight of the deicing agent and/or anti-icing agent.

The component g) is preferably an acidic pH regulator from the group consisting of the inorganic or organic acids, such as phosphoric acid, phosphorous acid, mono- and dicarboxylic acids having alkyl groups with 2 to 12 C atoms, preferably 4 to 8 C atoms, and one or more, preferably one or two, benzene rings. If the deicing agent and/or anti-icing agent according to the invention contains such an acidic pH regulator, the content thereof is preferably from 0.1% by weight to 5.0% by weight, based on the weight of the deicing agent and/or anti-icing agent.

The deicing agent and/or anti-icing agent according to the invention preferably contains at least 5.0% by weight, particularly preferably at least 10.0% by weight, of water.

Furthermore, the deicing agent and/or anti-icing agent may contain antifoams, dyes, complexing agents and antioxidants.

The deicing agent and/or anti-icing agent according to the invention has a comparatively high at-rest viscosity. This is preferably in the range from 3000 mPa·s to 60 000 mPa·s, more preferably, in the range from 3500 mPa·s to 50 000 mPa·s and particularly preferably in the range from 4000 mPa·s to 40 000 mPa·s. It is preferably measured at 0.3 rpm and 20° C.

Furthermore, the deicing agent and/or anti-icing agent according to the invention has a comparatively low flow viscosity. This is preferably less than 1500 mPa·s, more preferably less than 1200 mPa·s and particularly preferably less than 1000 mPa·s. It is preferably measured at 60 rpm and 20° C.

Furthermore, the deicing agent and/or anti-icing agent according to the invention has no significant irreversible viscosity loss after mechanical loading. If the at-rest viscosity of the agent is compared before and after the mechanical loading, the agent usually loses not more than 30%, preferably not more than 25% and very particularly preferably not more than 20% of its original viscosity.

For investigating the viscosity loss, for example, a stirrer of the Ultraturrax type can be used. When the Ultraturrax stirrer is immersed in the deicing agent and/or anti-icing agent, the thickener molecules are pressed through the narrow gap between rotor and stator, it being possible for said thickener molecules to be irreversibly damaged depending on thickener type. The resulting viscosity loss leads to reduction in the hold-back time.

In the present invention, the completely dried deicing agent and/or anti-icing agent should as far as possible form no residues which swell to give sparingly soluble gels as a result of rehydration. For example, aluminum sheet comprising 2024-T3 material and having an area of 100 mm×50 mm×1 mm can be used for investigating the gel formation. The surface of the metal sheet is preferably aged by alternate brief immersion in sodium hydroxide solution and nitric acid in each case so that fluid and gel residues can better adhere. The aluminum sheet is expediently immersed completely for four seconds in the fluid to be investigated and is then dried at a temperature of from 30° C. to 35° C. This step is repeated six times with the same metal sheet after 24 hours in each case. Within this first test phase, a dry residue gradually forms on the aluminum surface.

In the second test step, the metal sheet with the dried fluid residue is preferably immersed for 30 seconds in demineralized water and completely withdrawn again from the water. After preferably 60 seconds, the weight of the metal sheet with the swollen fluid residue is weighed. This rehydration step is advantageously repeated ten times all together. The tendency of the fluid to gel is then assessed from the variation of the weight change.

The deicing agent and/or anti-icing agent of the present invention furthermore has a superior property profile. Usually, all requirements of the SAE specification AMS 1428 are also met. Thus, the anti-icing time (WSET test) of these agents is as a rule greater than 30 minutes. The 1:1 dilution with water usually gives a hold-back time of more than 5 minutes. In the wind tunnel, the flow-off behavior of all concentrations to be tested corresponds as a rule to the minimum requirement at all required temperatures. In addition, all further material tests are usually also passed.

The deicing and anti-icing agents according to the invention can be prepared in a manner known per se by mixing the components.

The invention is now illustrated by examples.

First, two reference deicing and anti-icing agents are prepared by mixing the following components:

Reference 1 (based on 1,2-propylene glycol):

| 50.00% by weight | 1,2-propylene glycol |
| 0.05% by weight | benzotriazole |
| 0.25% by weight | Carbopol ® 934 [1] |
| 0.1% by weight | Intrasol FA ® 12/18/5 [2] |
| 49.6% by weight | water |

[1] Crosslinked polyacrylic acid, BF Goodrich Chemical Co.

[2] Ethoxylated fatty alcohol, Ashland Deutschland GmbH

Reference 2 (based on ethylene glycol):

| 50.00% by weight | ethylene glycol |
| 0.05% by weight | benzotriazole |
| 0.2% by weight | Carbopol ® 934 |
| 0.1% by weight | Intrasol FA ® 12/18/5 |
| 49.6% by weight | water |

The components were dissolved by vigorous mixing at room temperature within 3 h. The pH of these and all mixtures described below was adjusted to 7.0 by addition of sodium hydroxide.

The deicing and anti-icing agent obtained was investigated with regard to the viscosity (Haake Rheo Stress 600/cylinder system Z40 DIN).

Reference 1 (based on 1,2-propylene glycol):

| Viscosity (0.3 rpm, 20° C.) (at-rest viscosity) | Viscosity (60 rpm, 20° C.) (flow viscosity) |
|---|---|
| 10 050 mPa · s | 460 mPa · s |

Reference 2 (based on ethylene glycol):

| Viscosity (0.3 rpm, 20° C.) (at-rest viscosity) | Viscosity (60 rpm, 20° C.) (flow viscosity) |
|---|---|
| 2570 mPa · s | 185 mPa · s |

A number of deicing and anti-icing agents according to the invention will now be prepared.

EXAMPLE 1

| | |
|---|---|
| 50.00% by weight | 1,2-propylene glycol |
| 0.05% by weight | benzotriazole |
| 0.25% by weight | Carbopol ® 934 |
| 0.1% by weight | Intrasol ® FA 12/18/5 |
| 0.025% by weight | Boltorn ® P500 [1] |
| 49.6% by weight | water |

[1] Dendritic polyester/ether, Perstorp Specialty Chemicals AB

The components were dissolved by vigorous stirring at room temperature within 3 h. The deicing and anti-icing agent obtained was investigated with regard to the viscosity.

| Viscosity (0.3 rpm, 20° C.) (at-rest viscosity) | Viscosity (60 rpm, 20° C.) (flow viscosity) |
|---|---|
| 15 500 mPa · s | 680 mPa · s |

EXAMPLE 2

| | |
|---|---|
| 50.00% by weight | 1,2-propylene glycol |
| 0.05% by weight | benzotriazole |
| 0.25% by weight | Carbopol ® 934 |
| 0.1% by weight | Intrasol ® FA 12/18/5 |
| 0.025% by weight | Hybrane ® S 1200 [1] |
| 49.6% by weight | water |

[1] Dendritic polyesteramide, DSM Hybrane B.V.

The components were dissolved by vigorous stirring at room temperature within 3 h. The deicing and anti-icing agent obtained was investigated with regard to the viscosity.

| Viscosity (0.3 rpm, 20° C.) (at-rest viscosity) | Viscosity (60 rpm, 20° C.) (flow viscosity) |
|---|---|
| 12 800 mPa · s | 480 mPa · s |

EXAMPLE 3

| | |
|---|---|
| 50.00% by weight | 1,2-propylene glycol |
| 0.05% by weight | benzotriazole |
| 0.25% by weight | Carbopol ® 934 |
| 0.1% by weight | Intrasol ® FA 12/18/5 |
| 0.025% by weight | Dendritic polyether [1] |
| 49.6% by weight | water |

[1] Dendritic polyether obtained as described in WO 00/56802 (Mw: 3800 g/mol, OH number: 260-300 mg KOH/g, polydispersity $M_w/M_n$: 1.4, viscosity (23° C., 30 1/s): 25 Pa · s).

The components were dissolved by vigorous stirring at room temperature within 3 h. The deicing and anti-icing agent obtained was investigated with regard to viscosity.

| Viscosity (0.3 rpm, 20° C.) (at-rest viscosity) | Viscosity (60 rpm, 20° C.) (flow viscosity) |
|---|---|
| 20 130 mPa · s | 750 mPa · s |

EXAMPLE 4

| | |
|---|---|
| 50.00% by weight | ethylene glycol |
| 0.05% by weight | benzotriazole |
| 0.2% by weight | ®Carbopol 934 |
| 0.1% by weight | ®INTRASOL FA 12/18/5 |
| 0.025% by weight | ®Hybrane S 1200 |
| 49.6% by weight | water |

The components were dissolved by vigorous stirring at room temperature within 3 h. The deicing and anti-icing agent obtained was investigated with regard to the viscosity.

| Viscosity (0.3 rpm, 20° C.) (at-rest viscosity) | Viscosity (60 rpm, 20° C.) (flow viscosity) |
|---|---|
| 4600 mPa · s | 270 mPa · s |

Possible fields of use of the deicing and anti-icing agent according to the invention are directly evident to the person skilled in the art. It is suitable in particular for de-icing aircraft. However, it is also expedient for de-icing and preventing icing of other means of transport, such as motor vehicles or railways, or for any desired surfaces on which icing is to be prevented.

The invention claimed is:

1. A deicing or anti-icing agent suitable for use for aircraft comprising, based in each case on its total weight,
    a) from 35.0% by weight to 95.0% by weight of at least one glycol wherein said at least one glycol is selected from the group consisting of: alkylene glycols having 2 or 3 C atoms, and oxalkylene glycols having 4 to 6 C atoms;
    b) from 0.001% by weight to 5.0% by weight of at least one dendritic polymer; and
    c) from 0.01% by weight to 5.0% by weight of at least one additional thickener.

2. The agent of claim 1, further comprising up to 10.0% by weight of at least one nonionic or anionic surfactant.

3. The agent of claim 1, further comprising from 0.01% by weight to 5.0% by weight of at least one corrosion inhibitor.

4. The agent of claim 1, wherein said dendritic polymer is a hyperbranched polymer.

5. The agent of claim 1, wherein said dendritic polymer has a weight average molecular weight, Mw, in the range of from 300 g/mol to 100 000 g/mol.

6. The agent of claim 1, wherein said dendritic polymer has a polydispersity, Mw/Mn, in the range of 1-50.

7. The agent of claim 1, wherein said dendritic polymer has a degree of branching, DB, according to Frey or Fréchet in the range of from more than 0.0% to 85.0%.

8. The agent of claim 1, wherein said dendritic polymer has a solubility in a glycol-water mixture of at least 0.1 g, based on 100.0 g of glycol-water mixture, measured at 25° C.

9. The agent of claim 1, wherein said dendritic polymer comprises polyether, polyetheramide, polyetherimide, polyethersulfone, polyester, polyesteramide, polyesterimide, polyamide, polyamidoamine, polyimidoamine, polyurethane, polyurea, polyureaurethane, polyglycerol, polyvinylidene fluoride, polysulfonamine, polyethyleneimine, polyacrylic acid, polyacrylate, polysiloxane, polyethersiloxane, polyimide and/or polymethacrylate units.

10. The agent of claim 1, wherein said dendritic polymer has from 2 to 10 000 repeat units.

11. The agent of claim 1, wherein said dendritic polymer has terminal $NH_2$ groups.

12. The agent of claim 1, wherein said dendritic polymer has terminal COOH groups.

13. The agent of claim 1, wherein said dendritic polymer has terminal OH groups.

14. The agent of claim 1, wherein said additional thickener is an organic thickener selected from the group consisting of: the homo- or copolymers of unsaturated carboxylic acids and derivatives thereof, the cellulose ethers, the polyethylene glycols, the polyvinylpyrrolidones, the polyvinyl alcohols, the polyethylene oxides and xanthan gum.

15. The agent of claim 1, further comprising water.

16. A method for thickening a composition comprising from 0% by weight to 95.0% by weight of at least one glycol, said method comprising adding from 0.001 to 5.0% by weight of at least one dendritic polymer and from 0.01% by weight to 5.0% by weight of at least one additional thickener to said composition.

17. The method of claim 16, wherein said composition further comprises water.

* * * * *